United States Patent
Ramani et al.

(10) Patent No.: US 7,418,659 B2
(45) Date of Patent: Aug. 26, 2008

(54) SYSTEM AND METHOD FOR DECLARING A RESOURCE WITHIN A MARKUP DOCUMENT

(75) Inventors: Sundaram Ramani, Redmond, WA (US); Roger F. Grambihler, Woodinville, WA (US); Robert A. Relyea, Bellevue, WA (US); Jeffrey L. Bogdan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 10/377,582

(22) Filed: Feb. 28, 2003

(65) Prior Publication Data

US 2004/0172596 A1 Sep. 2, 2004

(51) Int. Cl.
 *G06F 15/00* (2006.01)
 *G06F 17/00* (2006.01)
(52) U.S. Cl. ..................... 715/234; 717/143
(58) Field of Classification Search ......... 715/503–526, 715/234, 239; 717/143; 706/45
 See application file for complete search history.

(56) References Cited

U.S. PATENT DOCUMENTS

| | | | |
|---|---|---|---|
| 6,480,865 B1* | 11/2002 | Lee et al. ............... | 715/523 |
| 6,732,330 B1* | 5/2004 | Claussen et al. ......... | 715/234 |
| 6,941,510 B1* | 9/2005 | Ozzie et al. ............. | 715/234 |
| 7,120,618 B2* | 10/2006 | Ramani et al. ........... | 706/45 |
| 2004/0117776 A1* | 6/2004 | Pazandak ................ | 717/143 |

OTHER PUBLICATIONS

Oreizy et al., Architecture-based runtime software evolution, ACM, Apr. 1998, pp. 177-186.*
Roy T. Fielding; "Maintaining Distributed Hypertext Infostructures: Welcome to MOMspider's Wed"; Jun. 17, 1994; 11 pgs.

* cited by examiner

*Primary Examiner*—William L Bashore
(74) *Attorney, Agent, or Firm*—Merchant & Gould; Ryan T. Grace

(57) ABSTRACT

Described is a system and method for declaring a resource element in markup that is intended to be instantiated lazily only upon use at run-time rather than always at markup load time. In one embodiment, the invention provides a parent resources tag that encloses resource elements that may be any type of markup element. On compile, a specially prepared compiler/parser identifies the Resource tag and creates definitional information sufficient to describe the resource elements in such a manner that the resource elements are defined but not created at run-time when the markup is first loaded, and are created only upon use at run-time. A resource may be defined to be shared or non-shared. If shared, the resource is instantiated only once and that same instance is handed out each time the resource is accessed. If non-shared, a new instance of the resource is always created and handed out on each access of the resource.

19 Claims, 5 Drawing Sheets

```
public class Resdemopage : Avalon.Base.DockPanel {    ← 401                    400
    private static string s_res_CLRString = null;                              ←
                                              ← 414
    public Resdemopage() { this.__Initialize_This(); } private static string _InitResource_CLRString() {    ← 403
        string _String_2_ = "Page2.xaml";
        return _String_2_ ; }                                    ← 405 private static Avalon.Base.FlowPanel _InitResource_TreeResource() {
        return new TreeResClass3(); } private void __Initialize_This() {
        Avalon.Base.DockPanel _DockPanel_1_ = this;
        Avalon.Base.Frame _Frame_7_ = new Avalon.Base.Frame();
        _Frame_7_.SetValue(Avalon.Base.Frame.SourceProperty, Resdemopage.Resources.CLRString);
        _DockPanel_1_.Elements.Add(_Frame_7_); }

⎡ public class Resources {                ← 412
    ⎢
    ⎢     public static string CLRString {
    ⎢         get {
    ⎢             if ((Resdemopage.s_res_CLRString == null)) {
    ⎢                 Resdemopage.s_res_CLRString = Resdemopage._InitResource_CLRString();
    ⎢             }
411⎨             return Resdemopage.s_res_CLRString;
    ⎢         }
    ⎢     }                                              ← 413
    ⎢
    ⎢     public static Avalon.Base.FlowPanel TreeResource {
    ⎢         get { return Resdemopage._InitResource_TreeResource(); }
    ⎣     }
      }

⎡ public class TreeResClass3 : Avalon.Base.FlowPanel {
    ⎢
    ⎢     private Avalon.Base.Button button1;
    ⎢
    ⎢     #line 7 "resdemopage.xaml"
    ⎢
    ⎢         void HandlerInResource(Element target, ClickEventArgs args)
    ⎢         { button1.Nodes.Clear(); }
    ⎢
    ⎢     #line default
    ⎢
    ⎢     public TreeResClass3() { this.__Initialize_This(); }
    ⎢
    ⎢     private void __Initialize_This() {
    ⎢         Avalon.Base.FlowPanel _FlowPanel_3_ = this;
    ⎢         Avalon.Base.Button _Button_4_ = new Avalon.Base.Button();
409⎨         this.button1 = _Button_4_;
    ⎢         _Button_4_.SetValue(Avalon.Base.Element.IDProperty, "button1");
    ⎢         _Button_4_.AddHandler(Avalon.Base.ButtonBase.ClickEvent,
    ⎢ new Avalon.Base.ClickEventHandler(this.HandlerInResource),
    ⎢ EventStage.Bubble, EventHandled.Unhandled, true);
    ⎢         _FlowPanel_3_.Elements.Add(_Button_4_);
    ⎢         Avalon.Base.TextBox _TextBox_5_ = new Avalon.Base.TextBox();
    ⎢         _FlowPanel_3_.Elements.Add(_TextBox_5_);
    ⎢         _TextBox_5_.Nodes.Add("hello");
    ⎢         Avalon.Base.HyperLink _HyperLink_6_ = new Avalon.Base.HyperLink();
    ⎢ _HyperLink_6_.SetValue(Avalon.Base.HyperLink.NavigateUrlProperty,
    ⎢ Resdemopage.Resources.CLRString);
    ⎢         _FlowPanel_3_.Elements.Add(_HyperLink_6_);
    ⎢         _HyperLink_6_.Nodes.Add("Page2.xaml");
    ⎢     }
    ⎣ }
      }
```

*Fig. 4*

SYSTEM AND METHOD FOR DECLARING A RESOURCE WITHIN A MARKUP DOCUMENT

BACKGROUND OF THE INVENTION

The Internet has achieved widespread acceptance. Information and services are becoming available at lightning speed. One major contributing factor to this acceptance has been the creation of the markup document with hyperlinks. This type of document has simplified the creation of resources while at the same time improving their usability. Markup languages are commonly much simpler and easier to understand, making markup document much more simple to create. Many novice users are able to quickly and easily create interesting markup documents that are then made available to millions of other users.

The benefit of simplicity that has made markup documents so popular, however, can also be a limiting factor on the efficiency of elements created in markup. For example, every element in a traditional markup document is created in memory when the markup document is loaded. This can be extremely inefficient in cases where a particular element in a markup document is declared but never actually used. In addition, if a type of element is declared multiple times in a traditional markup document, each instance of the element is created as a separate component in memory even if each of the elements serves the same purpose and is configured exactly alike.

A system that overcomes these inefficiencies has eluded those skilled in the art.

SUMMARY OF THE INVENTION

The present invention is directed at a system and method for declaring a resource element in markup that is intended to be instantiated lazily only upon use at run-time rather than always at markup load time. Briefly stated, a special markup tag is used within a markup documents to identify resource elements. The resource elements are intended to be defined but not created at run-time when the markup is first loaded. Instead, they are created upon use at run-time. A resource may be defined to be shared or non-shared. If shared, the resource is instantiated only once and that same instance is handed out each time the resource is accessed. If non-shared, a new instance of the resource is always created and handed out on each access of the resource.

In one aspect, the invention provides a method for analyzing a markup document to identify the special markup tag and to generate definitional information that defines any resource elements enclosed within the special markup tag. The definitional information is passed to a run-time environment for execution. During execution, if any resource elements are referenced, the definitional information is used to create an instance of the reference to resource element at that time.

In another aspect, the invention provides computer-executable components for performing the method just described. The components may include a specially prepared compiler/parser configured to identify the special markup tag (e.g., a "Resources" tag) and to generate the definitional information.

In yet another aspect, the invention provides a data structure including a plurality of markup tags that include at least the special markup tag. The special markup tag encloses a plurality of resource elements the creation of which is intended to be delayed until actual use is made of the resource elements. The resource elements may include a tree resource that encloses other elements.

BRIEF DESCRIPTION OF THE DRAWINGS

FIG. 4 is an exemplary source code listing of representative source code generated by the runtime environment shown in FIG. 2 based on the markup document illustrated in FIG. 3.

DETAILED DESCRIPTION OF THE PREFERRED EMBODIMENT

In one embodiment, the invention provides a Resources tag that encloses resource elements that may be any type of markup element. On compile, a specially prepared compiler/parser identifies the Resource tag and creates definitional information sufficient to describe the resource elements in such a manner that the resource elements are defined but not created at run-time when the markup is first loaded, and are created only upon use at run-time.

The following detailed description is divided into several sections. A first section describes an illustrative computing environment in which the present invention may operate. A second section describes an exemplary implementation for declaratively defining resources within markup documents. A third section describes an exemplary process for generating code that includes definitional information about resources that will be instantiated at run-time, in accordance with the present invention.

Illustrative Computing Environment

Figure 1:
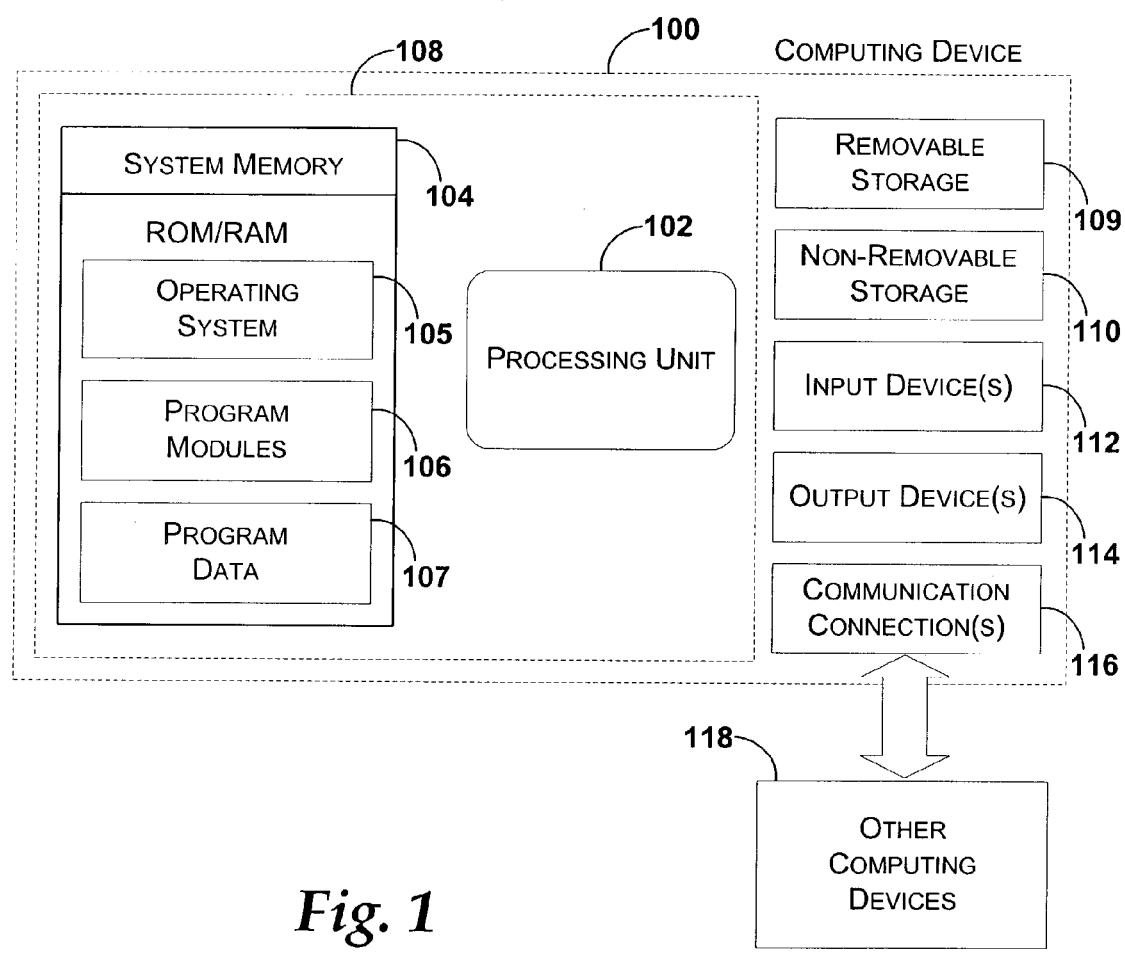
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, (a word processor, and the like. This basic configuration is illustrated in FIG. 1 by those components within dashed line 108

Computing device 100 may have additional features or functionality. For example, computing device 100 may also include additional data storage devices removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
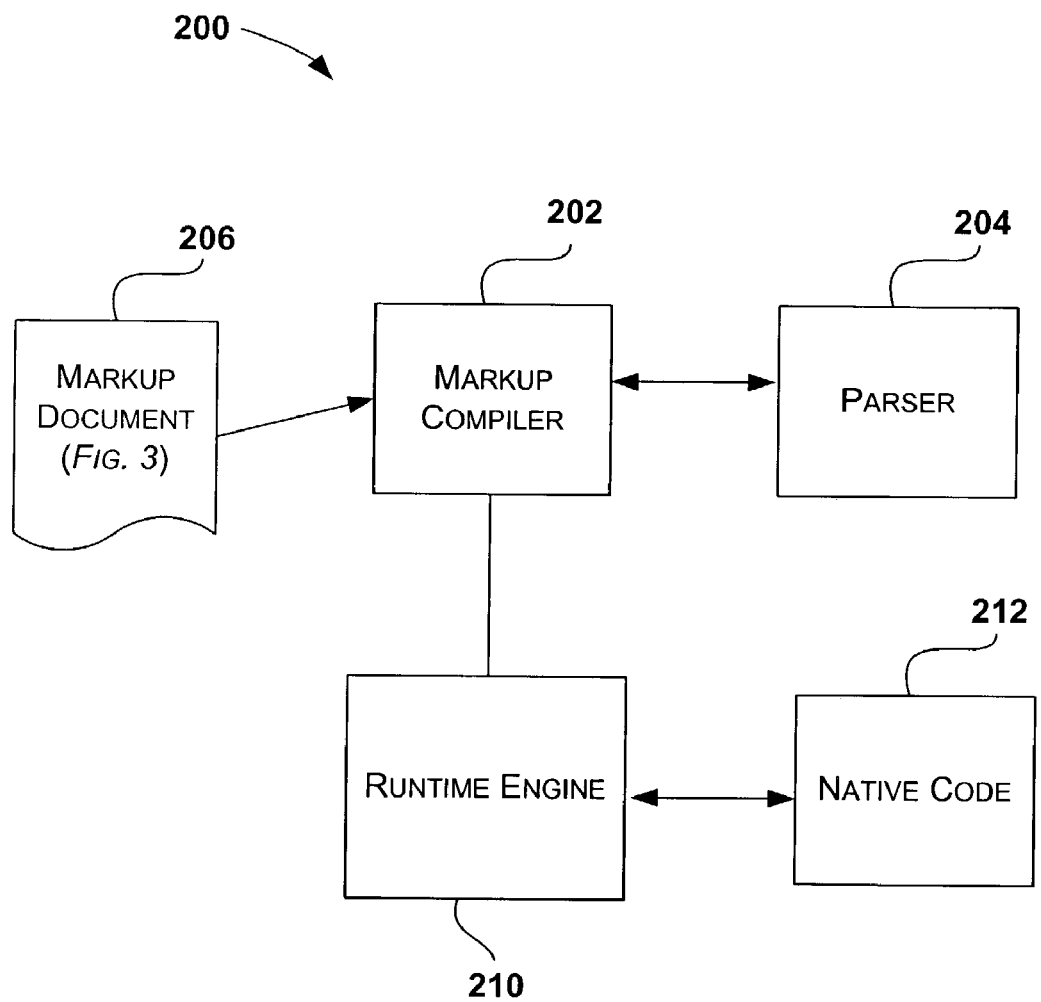
FIG. 2 is a functional block diagram generally illustrating components of a runtime environment implementing one embodiment of the present invention.

FIG. 2 is a functional block diagram generally illustrating a markup execution environment 200 implementing one embodiment of the present invention. The system includes a markup compiler 202 and a parser 204. The markup compiler 202 and parser 204 are software modules, such as program modules 106 shown in FIG. 1, that may reside on a computing device, such as computing device 100 shown in FIG. 1. The markup compiler 202 receives as input a markup document 206. In one embodiment, the markup document 206 is an extensible markup language (XML)—based document. Briefly, the markup document 206, illustrated in FIG. 3 and described in detail below, includes tags (not shown) that define the elements of the markup-based page or application. Those tags include a special tag (e.g., a "Resources" tag) that declares certain elements as being identified for creation only upon use rather than at run-time when the markup is first loaded. If instructed to compile the markup document 206, the markup compiler 202 communicates with the parser 204 in order to compile the markup document 206.

The parser 204 is configured to parse tags within markup document 206. Briefly, the markup compiler 202 creates a stream from the markup document 206 and passes this information to the parser 204. If the parser 204 sees a "Resources" tag in the markup stream, it instructs the markup compiler 202 to generate instructions (described more fully in conjunction with FIGS. 3-4) that create definitional information about any elements within the Resources tag. The definitional information make take the form of code that defines the elements within the Resources tag but which delays the creation (instantiation) of those elements until actually used at run-time. This differs from existing mechanisms for loading markup documents in that elements declared in markup and loaded at run-time using prior technologies merely create each element declared. Unlike with the present invention, there are no provisions for defining those elements while delaying their actual creation until used.

In one embodiment, the functionality provided by the parser 204 may be provided within markup compiler 202. In another embodiment, the functionality provided by the parser 204 may be provided by another component, such as a parsing class derived from an existing parser class within the markup compiler 202.

The markup compiler 202 in one embodiment, creates source code for instantiating a tree of elements that are defined in the markup, that is then compiled into an intermediate language (IL) assembly. This output (the IL assembly) of the markup compiler 202 is passed to a runtime engine 210 that converts it to native code 212 and executes it. In another embodiment, it creates a tokenized binary stream of information based on the markup text within markup document 206 that is then loaded by a binary reader at run-time.

Figure 3:
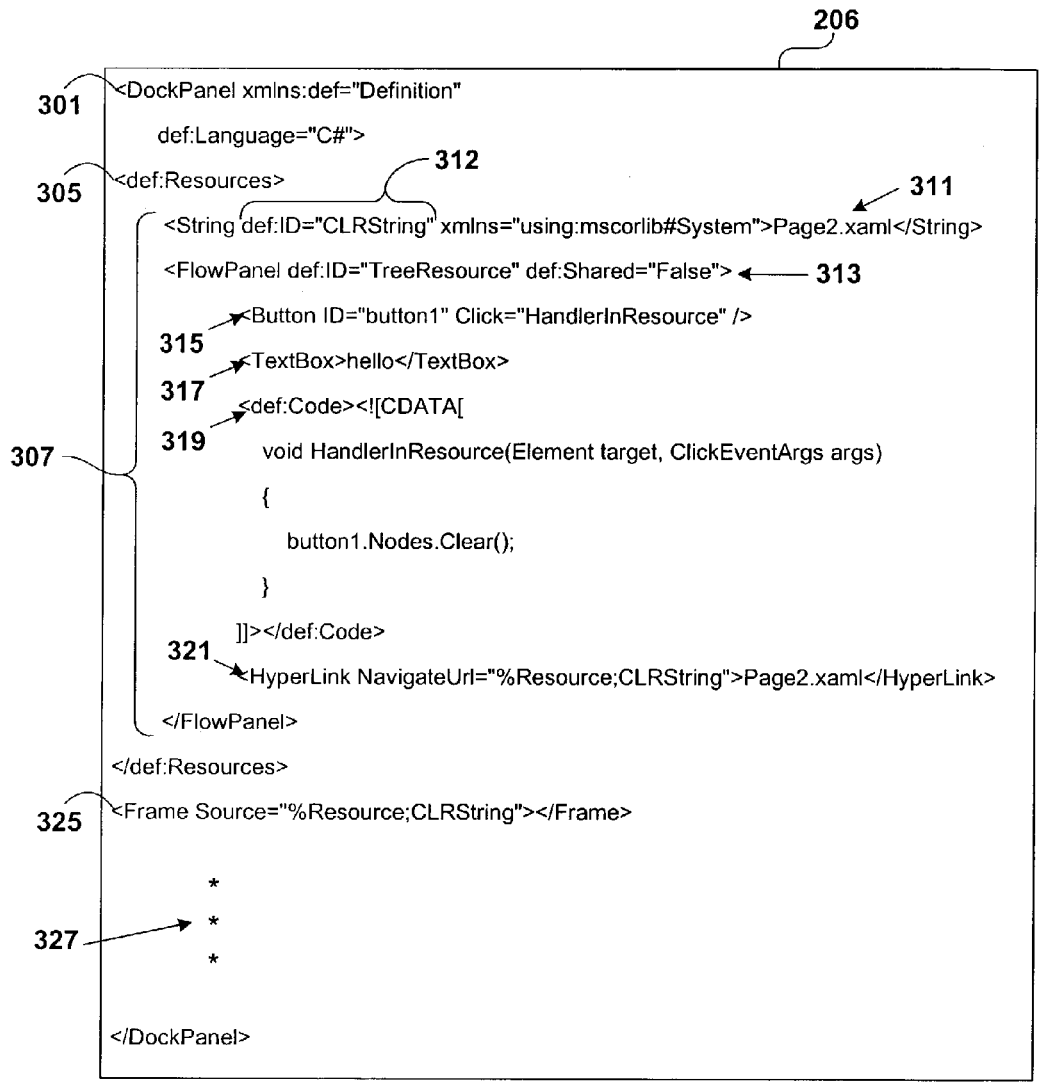
FIG. 3 illustrates salient portions of a markup document that illustrates an exemplary syntax for declaring resources that are instantiated on an as-used basis, in accordance with one embodiment of the present invention.

FIG. 3 is a graphical representation of salient portions of markup within markup document 206 that illustrates an exemplary syntax for declaring resources that are created only upon request rather than at markup load-time. Illustrated in FIG. 3 is a page of markup that has a DockPanel element 301 as the root. A Resources tag 305 defines a group of elements (called "resources") 307 that are intended to benefit from the invention. It should be noted that the term "Resources" is an arbitrary term and any other term may be used equally as well. The group of resources 307 can include any arbitrary type of element. In this example the group of resources 307 includes a string resource 311 and a tree resource 313. In this particular implementation, each resource includes a unique identifier. For instance, the string resource 311 has an ID "CLRString" 312, and the tree resource 313 has an ID "TreeResource". The string resource 311 does not have a def: Shared attribute and so the default value of true is used which means the string resource is shared. On the other hand, the tree resource 313 has an explicit def:Shared attribute set to "False", to indicate that this resource should be non-shared.

In this particular example, a tree resource is a container element that includes other nested elements. In this example, the tree resource 313 includes a button element 315, a text box element 317, specific code 319, and a hyperlink element 321. Other elements could also be included, and any one or more of these elements could be omitted without departing from the spirit of the invention.

In accordance with the invention, definitional information for each of the resources declared within the Resources tag 305 will be, at compile-time, created and passed to the runtime engine 210 (FIG. 2) for execution at run-time. Those resources, such as the string having the ID "CLRString" will not be instantiated until actually used during execution.

In this example, a frame tag 325 is included that defines a frame element. The source of the frame element is defined as "%Resource;CLRString". In this particular implementation, a particular resource is referenced by pre-pending the phrase "%Resource;" to the actual resource ID of the declared resource when assigning that resource to something (e.g., an element attribute or the like) in markup. Of course, the type of the resource should match the type of the thing to which the resource is being assigned. When the compiler\parser encounters this expression in the markup, it generates the appropriate code to access that resource programmatically. Other arbitrary elements 327 may also included in the markup document 206.

As an example, when the markup document 206 is compiled, the string resource 311 will be defined in code but not yet created. However, when the markup compiler 202 reaches the frame tag 325, the parser 204 will identify the reference to the string resource in the frame tag's Source attribute. At that time, a reference to the string resource 311 will be created as the attribute value in the code generated by the compiler such that at run-time execution, the actual value of the string resource, "Page2.xaml", will then be substituted into the source attribute of the frame tag 325. The benefits of this and many other uses of the invention will be apparent to those skilled in the art.

FIG. 4 is an illustrative source code listing representing source code that the markup compiler 202 could generate based on the salient portions of markup shown in FIG. 3. In one embodiment, the markup compiler 202 may actually generate a file containing the representative source code that is then compiled into an intermediate language (IL) assembly. In another embodiment, the markup may be compiled into a binary format file that contains a tokenized stream of the elements and resource definitions in the markup Referring now to both FIGS. 3 and 4 simultaneously, if the markup document 206 is compiled, a subclass is created for the root element of the markup document 206. In this example, a subclass named Resdemopage 401 with the Dock-Panel as the base class is created. If the parser 204 encounters a Resources tag, then for each resource, a private static method is added to the class owning the resource, referred to as the "owner class". In this case, the Resdemopage subclass 401 is the owner class. For example, a private static method$_{13}$ InitResource_CLRString() 403 (FIG. 4) is created that corresponds to the string resource 311 (FIG. 3). Likewise, a private static method_InitResource_TreeResource() 405 (FIG. 4) is created that corresponds to the FlowPanel tree resource 313 (FIG. 3). These methods contain calls to create a new instance of the resource. The methods also set any properties on those resources as they appear in the markup definition for that resource. The methods return an instance of the resource.

For a tree resource, an anonymous nested class reflecting the hierarchy of the tree resource is created and added to the owner class. Referring to the example, a TreeResClass3 class 409 (FIG. 4) is created that corresponds to the FlowPanel tree resource 313 (FIG. 3) in markup. The nested class holds any ID fields and user code defined in markup inside the tree resource. For example, the button 315, textbox 317, code 319, and hyperlink 321 (FIG. 3) each have corresponding entries that describe them in the TreeResClass3 class 409 (FIG. 4). The static method for the tree resource creates a new instance of the nested class and returns it. In this example, the tree resource method 405 creates a new instance of the TreeRes-Class3 class 409 and returns it.

In addition, a public nested class named "Resources" is added to the owner class. In this example, a Resources class 411 is added to the Resdemopage class 401. To the Resources class 411, a read-only public static property is added for each defined resource. The name of the property is the same as the resource ID, and the type of the property is the same as the type of the resource definition tag. Again referring to the instant example, a CLRString public static property 412 (FIG. 4) is added that corresponds to the string resource 311. A TreeResource public static property 413 (FIG. 4) of type FlowPanel is added that corresponds to the tree resource 313 (FIG. 3).

For a non-shared resources, the implementation of the property simply returns the result of the call to the static private method described earlier. In other words, querying the property causes the corresponding static method to be executed, which in turn creates a new instance of the corresponding resource each time the resource is accessed and returns that. In this example, the tree resource 313 is identified as non-shared, and thus, each invocation of the resource causes a new element to be created.

For a shared resource, a private static field whose type is the same as the resource type is also added to the owner class. The value of the private static field is initialized to null. Implementing the public static property in the 'Resources' class 411 makes the call to the private static method, which creates the resource if the static field is still null. Otherwise, the public static property returns the value of the static field. In this example, the resource CLRString is a shared resource (which is the default value of the def:Shared attribute), and therefore has a corresponding private static field 414.

Thus, a resource can be programmatically accessed using the following syntax:

OwnerClass.Resources.ResourceID where the OwnerClass is the name of the owner class, and the ResourceID is the ID of the particular resource being accessed.

Accordingly, to access the string resource 311, a call to Resdemopage.Resources.CLRString results in the CLRString public static property 412 being evaluated. As can be seen in FIG. 4, if the value of the static field 414 is null, then the resource has not yet been created in memory. As a result, a call to the _InitResource_CLRString method 403 causes the string to be created, stored in the private static field 414, and returned to the caller. If the value of the static field 414 is not null, then the same value (the resource) is simply returned.

To access the tree resource 313, a call to Resdemopage.Resources.TreeResource results in the TreeResource public static property 413 being evaluated. Because the TreeResource resource is not shared, there is no corresponding static field to evaluate. Rather, the call merely causes the _InitResource_TreeResource method 405 to be executed, thus resulting in a new instance of the resource for each call. In this example, the return value is an instance of the TreeResClass3 class 409.

Generalized Operation

What follows is a brief discussion of a general process for implementing the present invention. Many different specific embodiments of the process may be implemented. What will be described are the general characteristics of a process for identifying certain elements in a markup document that are intended to be created only on use, and which may be shared.

Figure 5:
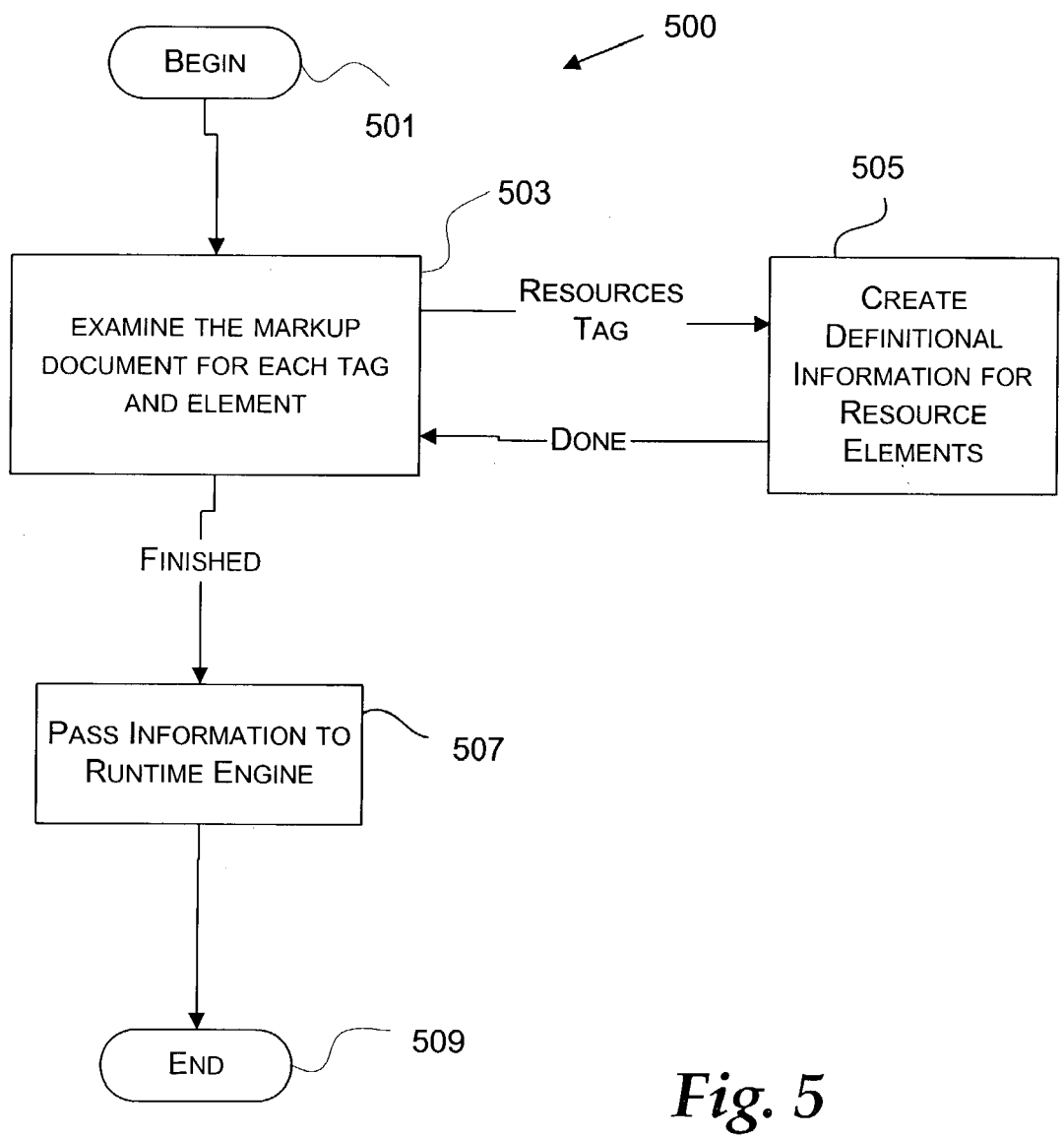
FIG. 5 is a logical flow diagram illustrating generalized steps for implementing one embodiment of the invention.

FIG. 5 is a logical flow diagram illustrating generalized steps for implementing one embodiment of the invention. The process begins at starting block 501, where a markup document is presented for loading. The document may exist locally on a computing system or it may be downloaded over a local or wide area network. The process continues at block 503.

At block 503, a compiler/parser examines the markup document searching for each tag and element it contains. The parser may identify each tag to the compiler, and the compiler creates instructions or code that represents functionality intended by each tag. In particular, the parser evaluates the markup document for a Resources tag. The Resources tag of this implementation acts as a container element for other elements that are intended to be declared but not created until used. The resource elements within the Resources tag may be referenced by other elements and any particular resource may be shared by more than one element in the markup document. If the markup document includes a Resources tag, the process continues to block 505.

At block 505, a Resources tag has been identified by the parser/compiler. Accordingly, the parser instructs the compiler to create definitional information that describes each element within the Resources tag. The information may take the form of code or other instructions that describe each element in the Resources tag sufficiently that they may be created only upon use, but need not be created until then. The resources may also be nested in a tree structure. One illustrative implementation of the definitional information has been presented above in conjunction with FIGS. 3 and 4. Other implementations will also become apparent.

Returning to block 503, if the compiler/parser is finished examining the markup document and has created any code or instructions for executing the markup, the process continues to block 507, where that information is passed to a runtime engine for execution. The process ends at ending block 509.

Thus, as described, the present invention provides a mechanism for defining and accessing markup resources that may be instantiated only on use and shared by multiple elements in a markup. By so doing, the present invention achieves a substantial increase in performance during runtime, by enabling pay for play creation of resources and by enabling reuse via sharing The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium encoded with computer-executable instructions, the instructions comprising:
   analyzing a markup document to identify a plurality of elements declared within the markup document;
   identifying a Resources tag declared within the markup document;
   identifying a resource element declared within the Resources tag, wherein the Resource tag indicates to a markup compiler to create source code having identification information for the resource element within the source code and to not create an instance of the resource element until the resource element is requested at run-time;
   causing the markup compiler to compile the markup document to generate the source code, wherein the source code includes identification information for the resource element within the source code, wherein the identification information includes a public property that returns a method for creating an instance of the resource element when the resource element is requested at run-time, wherein the source code does not include an instance of the resource until the resource element is requested at run-time and the method is executed;
   receiving a request for the instance of the resource element after the source code is generated; and
   obtaining the identification information for the resource element and executing the method in the source code to create an instance of the resource element in response to the request.

2. The computer-readable storage medium of claim 1, further comprising passing the identification information to the runtime environment for execution on a host computing system.

3. The computer-readable storage medium of claim 1, wherein identifying the Resources tag further comprises parsing the markup document to identify each of multiple tags within the markup document, each tag declaring an element.

4. The computer-readable storage medium of claim 1, wherein the Resources tag encloses a plurality of resource elements, each resource element having a resource identifier that is unique within the markup document.

5. The computer-readable storage medium of claim 4, wherein the plurality of resource elements includes at least one tree resource further enclosing another plurality of elements.

6. A computer-implemented method of compiling a markup document, comprising:
   evaluating the markup document to identify a Resources tag that encloses a resource element, wherein the Resource tag indicates to a markup compiler to create source code having identification information for the resource element within the source code and to not create an instance of the resource element until the resource element is requested at run-time;
   causing the markup compiler to compile the markup document to generate source code, wherein the source code includes identification information for the resource element within the source code, wherein the identification information includes a public property that returns a method for creating an instance of the resource element when the resource element is requested at run-time, wherein the source code does not include an instance of the resource until the resource element is requested at run-time;
   receiving a request for the instance of the resource element after the source code is generated; and
   obtaining the identification information for the resource element and executing the method in the source code to create an instance of the resource element in response to the request.

7. The computer-implemented method of claim 6, further comprising passing the identification information to the runtime environment for execution on a host computing system.

8. The computer-implemented method of claim 7, wherein identifying the Resources tag further comprises parsing the markup document to identify each of multiple tags within the markup document, each tag declaring an element.

9. The computer-implemented method of claim 7, wherein the Resources tag encloses a plurality of resource elements, each resource element having a resource identifier that is unique within the markup document.

10. A computer-readable storage medium encoded with computer-executable components, comprising:
    a markup document including a plurality of tags, the plurality of tags including a Resources tag that encloses a resource element, wherein the resource tag indicates to a markup compiler to create source code having identification information for the resource element within the source code and to not create an instance of the resource element until the resource element is requested at run-time; and
    a compiler/parser configured to evaluate the markup document, identify the Resources tag, and generate source code, wherein the source code includes identification information for the resource element within the source code, wherein the identification information includes a public property that returns a method for creating an instance of the resource element when the resource element is requested at run-time, wherein the source code does not include an instance of the resource until the resource element is requested at run-time, wherein the compiler/parser is configured to receive a request for the instance of the resource element after the source code is generated, and wherein the compiler/parser is configured to obtain the identification information for the resource element and execute the method in the source code to create an instance of the resource element in response to the request.

11. The computer-readable storage medium of claim 10, wherein the resource element includes a resource identifier that is unique within the markup document.

12. The computer-readable storage medium of claim 10, wherein the resource element further comprises a tree resource element that encloses other elements.

13. The computer-readable storage medium of claim 12, wherein the tree resource element is a container element for the other elements.

14. A computer-implemented method for compiling a markup document, the method comprising:
    analyzing a markup document to identify a plurality of elements declared within the markup document;
    identifying a Resources tag declared within the markup document;
    identifying a resource element declared within the Resources tag, wherein the resource tag indicates to a markup compiler to create source code having identification information for the resource element within the source code and to not create an instance of the resource element until the resource element is requested at run-time;
    causing the markup compiler to compile the markup document to generate the source code, wherein the source code includes identification information for the resource element within the source code, wherein the identification information includes a public property that returns a method for creating an instance of the resource element when the resource element is requested at run-time, wherein the source code does not include an instance of the resource until the resource element is requested at run-time and the method is executed;
    receiving a request for the instance of the resource element after the source code is generated; and
    obtaining the identification information for the resource element and executing the method in the source code to create an instance of the resource element in response to the request.

15. The computer implemented method of claim 14, further comprising passing the identification information to the runtime environment for execution on a host computing system.

16. The computer implemented method of claim 14, wherein identifying the Resources tag further comprises parsing the markup document to identify each of multiple tags within the markup document, each tag declaring an element.

17. The computer implemented method of claim 14, wherein the Resources tag encloses a plurality of resource elements, each resource element having a resource identifier that is unique within the markup document.

18. The computer implemented method of claim 17, wherein the plurality of resource elements includes at least one tree resource further enclosing another plurality of elements.

19. A system for compiling a markup document, the method comprising:
    a processor; and
    a memory having computer-executable instructions stored thereon, wherein the computer-executable instructions are configured to:
        analyze a markup document to identify a plurality of elements declared within the markup document;
        identify a Resources tag declared within the markup document;
        identifying a resource element declared within the Resources tag, wherein the resource tag indicates to a markup compiler to create source code having identification information for the resource element within the source code and to not create an instance of the resource element until the resource element is requested at run-time;
        cause the markup compiler to compile the markup document to generate the source code, wherein the source code includes identification information for the resource element within the source code, wherein the identification information includes a public property that returns a method for creating an instance of the resource element when the resource element is requested at run-time, wherein the source code does not include an instance of the resource until the resource element is requested at run-time and the method is executed;
        receive a request for the instance of the resource element after the source code is generated; and
        obtain the identification information for the resource element and executing the method in the source code to create an instance of the resource element in response to the request.

* * * * *

UNITED STATES PATENT AND TRADEMARK OFFICE
CERTIFICATE OF CORRECTION

PATENT NO.       : 7,418,659 B2                                    Page 1 of 1
APPLICATION NO.  : 10/377582
DATED            : August 26, 2008
INVENTOR(S)      : Sundaram Ramani et al.

It is certified that error appears in the above-identified patent and that said Letters Patent is hereby corrected as shown below:

In column 8, line 33, in Claim 8, delete "7," and insert -- 6, --, therefor.

In column 8, line 37, in Claim 9, delete "7," and insert -- 6, --, therefor.

Signed and Sealed this
Third Day of May, 2011

David J. Kappos
*Director of the United States Patent and Trademark Office*